(12) United States Patent
Guironnet De Massas et al.

(10) Patent No.: US 11,995,218 B2
(45) Date of Patent: May 28, 2024

(54) PROCESSOR WITH A CONFIGURABLE DISTRIBUTION OF PRIVILEGED RESOURCES AND EXCEPTIONS BETWEEN PROTECTION RINGS

(71) Applicant: Kalray, Montbonnot Saint Martin (FR)

(72) Inventors: Pierre Guironnet De Massas, Allevard (FR); Vincent Ray, Allevard (FR); Benoit Dupont De Dinechin, Grenoble (FR)

(73) Assignee: Kalray, Montbonnot Saint Martin (FR)

( * ) Notice: Subject to any disclaimer, the term of this patent is extended or adjusted under 35 U.S.C. 154(b) by 0 days.

(21) Appl. No.: 17/139,662

(22) Filed: Dec. 31, 2020

(65) Prior Publication Data

US 2021/0200904 A1 Jul. 1, 2021

(30) Foreign Application Priority Data

Dec. 31, 2019 (FR) ...................................... 1915755

(51) Int. Cl.
*G06F 21/71* (2013.01)
*G06F 21/74* (2013.01)

(52) U.S. Cl.
CPC .............. *G06F 21/71* (2013.01); *G06F 21/74* (2013.01); *G06F 2221/2113* (2013.01)

(58) Field of Classification Search
CPC .. G06F 21/71; G06F 2221/2113; G06F 21/74; G06F 2209/4812
See application file for complete search history.

(56) References Cited

U.S. PATENT DOCUMENTS

| | | | | |
|---|---|---|---|---|
| 5,303,378 A | * | 4/1994 | Cohen | G06F 12/1491 718/100 |
| 6,202,145 B1 | * | 3/2001 | Barnes | G06F 9/32 703/23 |
| 6,678,825 B1 | * | 1/2004 | Ellison | G06F 21/74 710/200 |
| 2002/0082823 A1 | * | 6/2002 | Traut | G06F 9/45558 703/27 |
| 2005/0076186 A1 | * | 4/2005 | Traut | G06F 9/45558 718/1 |
| 2006/0123416 A1 | * | 6/2006 | Cibrario Bertolotti | G06F 9/45533 718/1 |
| 2014/0351472 A1 | * | 11/2014 | Jebson | G06F 13/24 710/269 |
| 2015/0007318 A1 | * | 1/2015 | Van De Van | G06F 12/1491 726/23 |
| 2016/0335429 A1 | * | 11/2016 | Smith | G06F 21/6281 |
| 2016/0381050 A1 | * | 12/2016 | Shanbhogue | G06F 12/1081 726/23 |
| 2017/0228535 A1 | * | 8/2017 | Shanbhogue | G06F 9/461 |
| 2017/0364379 A1 | * | 12/2017 | Warkentin | G06F 11/362 |
| 2019/0163626 A1 | * | 5/2019 | Shaw, II | G06F 16/00 |

OTHER PUBLICATIONS

French Search Report for French Application No. FR1915755, dated Sep. 1, 2020, 8 pages.

* cited by examiner

*Primary Examiner* — Ellen Tran

(57) ABSTRACT

A processor having a plurality of protection rings and comprising a protection ring management system in which the attributions of exceptions or privileged resources to protection rings are defined by a programmable table.

11 Claims, 3 Drawing Sheets

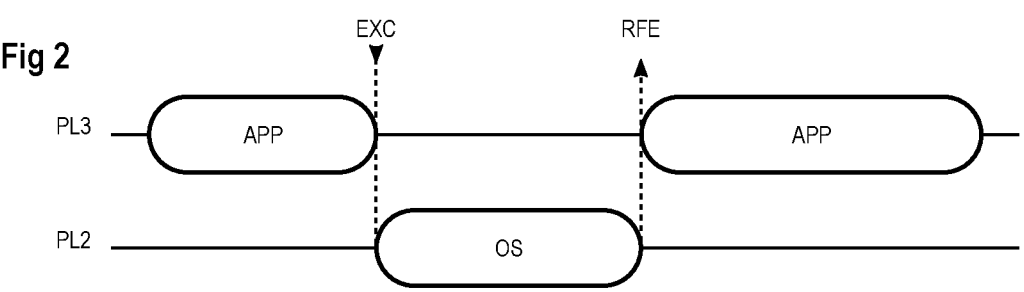
Fig 1A     Fig 1B     Fig 1C
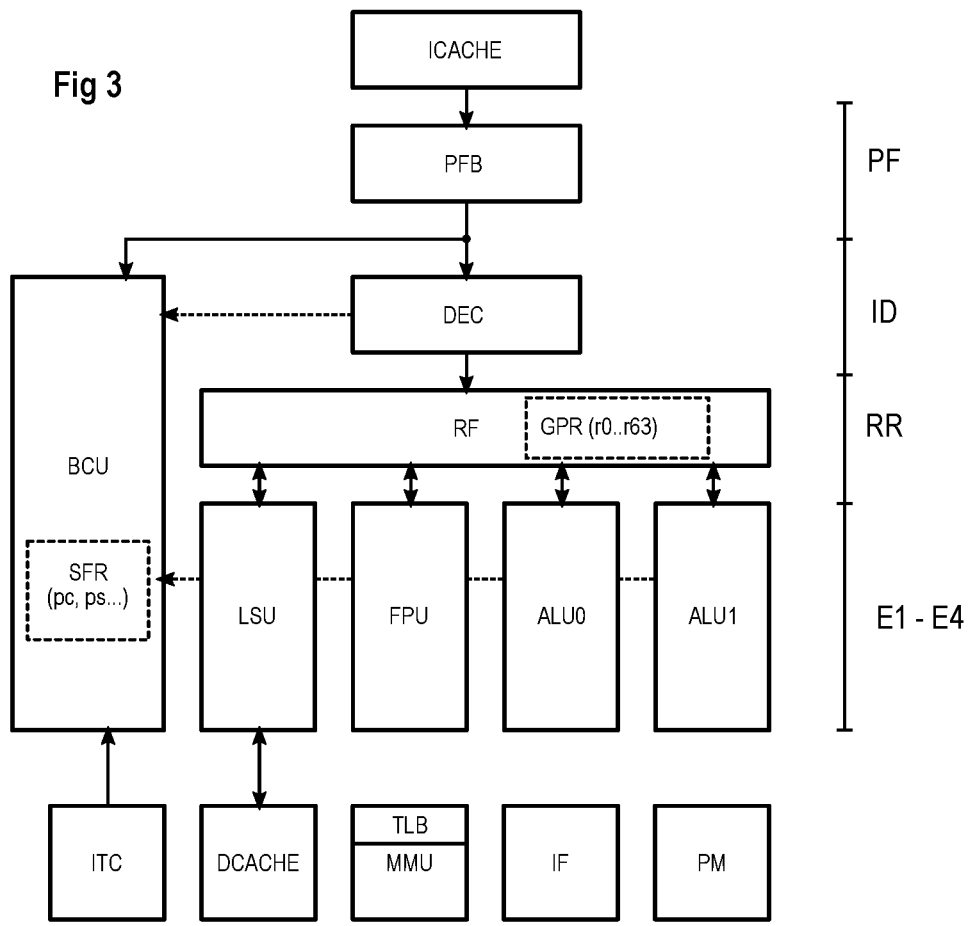

PROCESSOR WITH A CONFIGURABLE DISTRIBUTION OF PRIVILEGED RESOURCES AND EXCEPTIONS BETWEEN PROTECTION RINGS

CROSS-REFERENCE TO RELATED APPLICATION

This application is based on and claims priority under 35 U.S.C. § 119 to French Patent Application No. 19 15755 filed on Dec. 31, 2019, the disclosure of which is herein incorporated by reference in its entirety.

FIELD

The disclosure relates to protection rings or privilege levels of a processor, allowing different layers of software to interact securely.

BACKGROUND

Processors are generally designed to offer several execution privilege levels, also known as protection rings. The two terms are used interchangeably below.

In the state of the art, execution resources and hardware configuration registers are assigned to protection rings based on presumed privileges. An application code runs in the least privileged ring and cannot access functions such as configuring a memory management unit (MMU), input/output interfaces, clocks, etc. Supervisor code, such as an operating system, runs in a higher privilege ring but cannot access functions common to multiple virtualized operating systems, such as configuring an interrupt controller. Hypervisor code, such as a virtual machine monitor, runs in an even higher privilege ring, but cannot access hardware boot or low-level debugger configuration settings.

FIGS. 1A to 1C illustrate examples of protection ring assignments for different software stacks to be implemented on a same processor with four privilege levels PL0 to PL3, the privilege level PL0 being the highest. Privilege levels PL0 to PL3 are also called rings 0 to 3. Such an organization is used, for example, in x86 architecture processors.

FIG. 1A shows the common case of applications running over an operating system. The applications (USER) run in the least privileged ring 3, while the operating system (OS) may be assigned to the ring 2 immediately below. In this case, where the remaining rings are not used, the operating system could also be assigned to one of the rings 1 and 0. In fact, on an x86 processor, all four rings have never been fully used historically—the application code runs in ring 3 while the operating system (Linux, Windows, macOS) runs in ring 0. Running a software layer in a different ring usually involves recompiling the code.

FIG. 1B illustrates the context of a virtualized system. In this case, a hypervisor (host) system runs under the operating systems (guests), for example in ring 1. In an x86 processor, where ring 0 is historically assigned to the operating system, a "−1" ring had to be created to run the hypervisor, as documented, for example, in https://en.wikipedia.org/wiki/Protection_ring.

FIG. 1C illustrates the context of a low-level debugger in a virtualized system. The debugger runs under the hypervisor in ring 0.

FIG. 2 is a time diagram illustrating a transition between rings, for example between an application program APP running in ring 3 and the operating system OS running in ring 2. A transition to a lower (higher privilege) ring is usually initiated when an exception EXC is triggered. The term "exception" includes interrupts, hardware traps, and system calls. Interrupts and traps are usually triggered by hardware, while system calls are instructions executed by the running program itself.

When the exception EXC is triggered, the running program APP is rerouted to a handler provided by the operating system, running in ring 2. When the handler has finished, it returns to the original program by executing an instruction designated as RFE ("Return From Exception").

Exception handling is based on a processor status register PS, which contains several control bit fields, including the current execution ring, and exceptions to be masked. When an exception is triggered, the processor, in one hardware and atomic operation, saves the contents of the program counter PC and the register PS in locations called SPC ("Saved Program Counter") and SPS ("Saved Processor State"), and masks subsequent interrupts by setting corresponding fields in the PS register. The exception handler takes over and often starts by saving additional information from the execution context, which operation should not be interrupted lest the context be lost.

The handler ends with the execution of the RFE instruction. In response to the RFE instruction, the processor restores the original values of the PC and PS registers in a hardware and atomic manner from the backups at the SPC and SPS locations, after which the program APP resumes from the point it had reached when the exception was triggered.

Each exception is usually assigned by construction to a specific ring of lower rank (higher privilege) than the one where the exception may occur, often the ring of immediately lower rank for the sake of simplicity. The result is a rigid architecture that leads to trade-offs and reduced performance under certain circumstances.

SUMMARY

A processor is generally provided, having multiple protection rings and comprising a protection ring management system in which attributions of exceptions or privileged resources to protection rings are defined by a programmable table.

The table may be programmable by software upon booting the processor.

The ring management system may be configured to respond to an exception by diverting handling of the exception to the ring programmed for the exception.

The protection ring management system may be configured to trigger a privilege trap when accessing a privileged resource from a less privileged protection ring than the ring programmed for the privileged resource; and respond to the privilege trap by diverting the handling of the exception to the ring programmed for the privileged resource.

The processor may comprise hardware units that can trigger exceptions at the occurrence of events during the execution of a program by the processor; a processor status register identifying the current protection ring applied to the currently executed program; a programmable ownership register embodying the programmable table; for each protection ring, a respective processor status backup register, defining the protection ring and corresponding rights; and an exception handler circuit configured to, when an exception is triggered, index the ownership register with an identifier generated with the exception, to designate the corresponding protection ring; exchange the contents of the processor status register with the contents of the status backup register designated by the ownership register; and divert the current program to an exception handler, whereby the handler executes in the protection ring defined by the new contents of the processor status register.

The processor may comprise a program counter identifying the address of an instruction currently executed by the processor; for each protection ring, a respective backup register of the program counter; for each protection ring, a respective exception vector identifying the addresses of the exception handlers of the corresponding protection ring. The exception handling circuit may be configured to, when an exception is triggered, save the contents of the program counter in the program counter backup register designated by the ownership register; and write the address provided by the exception vector designated by the ownership register into the program counter.

The processor may include a system-register-write instruction implemented by the processor to write into the ownership register, identified by the instruction, a sum of the rank of the current ring and a parameter of the instruction conveying a relative rank.

The exceptions may include a horizontal interrupt, the ownership register being programmed to attribute the horizontal interrupt to the same protection ring as the program running at the time the interrupt is triggered.

A method for managing protection rings in a processor is also provided, comprising the steps of programming an ownership table for attributing exceptions or privileged resources to protection rings; when the processor triggers an event signaling an exception or an access to a privileged resource in a less privileged ring than the one programmed for the privileged resource, processing the event by a handler running in a protection ring allocated to the exception or privileged resource; and finding in the ownership table the protection ring allocated to the exception or privileged resource.

The method may include a step of programming the ownership table by software executed upon booting the processor.

The method may comprise the steps of executing a current program in a protection ring and according to rights defined in a processor status register; for each protection ring, defining, in a respective processor status backup register, a protection ring and corresponding rights; and when the event is triggered, exchanging the contents of the processor status register with the contents of the status backup register identified by the ownership table.

The method may comprise the steps of running a host hypervisor in a first ring; running a guest operating system in a second ring that is less privileged than the first ring, wherein the guest operating system is designed to manage a translation table for translating virtual addresses into physical addresses; running a user program in a third ring less privileged than the second ring, wherein the user program is designed to use virtual addresses applied to the translation table; attributing to the second ring a virtual address allocation failure exception, triggered when the translation table has no entry for a virtual address applied by the user program; attributing the translation table as a privileged resource to the first ring, whereby a write access attempt to the translation table by a less privileged ring triggers a privilege trap; and configuring a privilege trap handler, executed in the first ring by the hypervisor, to update the translation table.

BRIEF DESCRIPTION OF THE DRAWINGS

Embodiments will be exposed in the following description in relation to the attached drawings, among which:

FIGS. 1A to 1C, previously described, illustrate different program organizations in a group of protections rings;

FIG. 2, previously described, is a time diagram illustrating a generic handling of an exception;

FIG. 3 illustrates an architecture of an exemplary processor used as a basis for the disclosure;

DETAILED DESCRIPTION

Figure 4:
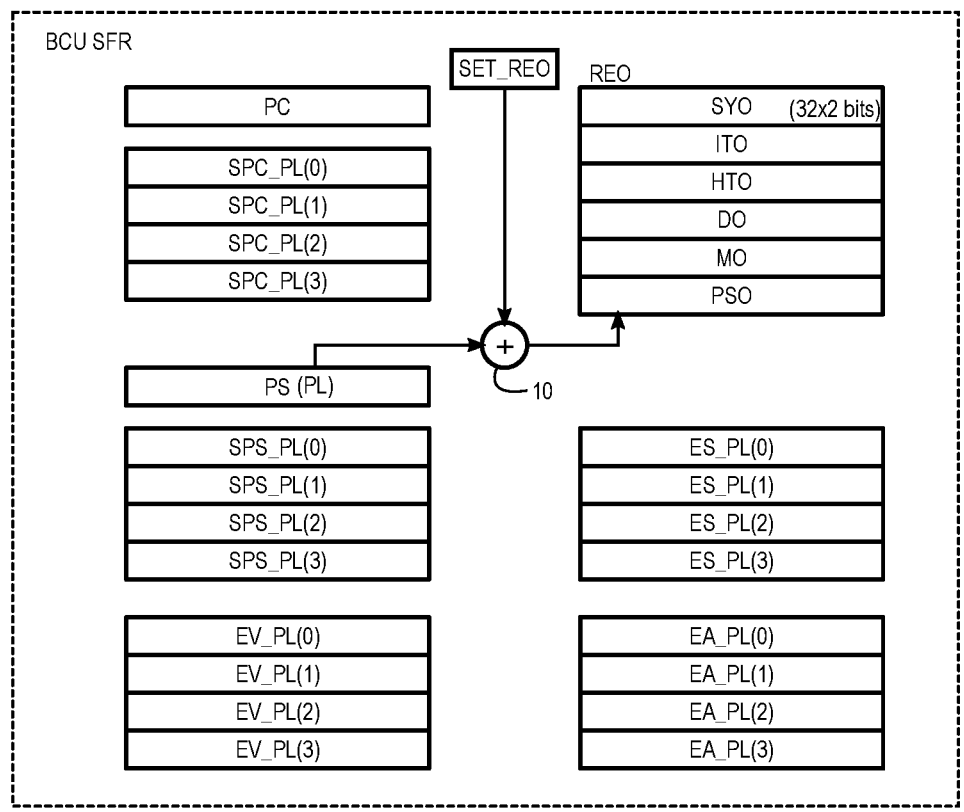
FIG. 4 shows an example of a system register set on which the disclosure may rely.

As previously mentioned, in conventional processor architectures with protection rings, each exception is assigned by design to a specific ring. This usually imposes a rigid organization of the software layers in the different rings. For example, if an ultimate organization of the type shown in FIG. 1C should be offered, where each ring contains a specific software layer, it appears that, when not all layers are needed, as in FIG. 1A, the actually used layers nevertheless remain in the rings assigned to them, leaving gaps. Indeed, shifting these software layers to other rings introduces a modification of the hardware platform as seen by the programs and generally requires a recompilation of these programs. Referring to the example of the x86 architecture, the application code and the operating system are historically "locked" in rings 3 and 0, respectively, making it difficult to insert hypervisor code in a more privileged ring, which was not provided.

In the remainder of the disclosure, the term "exception" is used to designate events that could cause the processor to be redirected, such as: interrupts, hardware traps, system calls. The term "resource" refers to hardware elements that can be manipulated by a program: specific instructions, specific registers, fields in a register, hardware components integrated into the core (such as a clock), or combinations thereof.

The present disclosure proposes a processor structure that allows a software layer to be executed in an arbitrary ring without the need for code recompilation. For this purpose, the assignment of exceptions and certain resources, called privileged resources, to the rings are made programmable. For example, during a processor boot phase preceding the execution of the different provided software layers, each exception or privileged resource is assigned to one of the available rings, for example according to the contents of a pre-programmed table, in practice one or more dedicated registers of the processor.

FIG. 3 illustrates an architecture of an exemplary processor core serving as a basis for a programmable assignment of exceptions to rings, such as a core of the Kalray Coolidge processor. The core has a 7-stage deep pipeline, including an instruction pre-fetch stage PF, an instruction decoding stage ID, a register read stage RR, and four instruction execution stages E1 to E4.

The PF stage essentially includes a buffer PFB storing preloaded instructions, supplied from an instruction cache ICACHE. The ID stage includes an instruction decoding unit DEC that controls a register file RF forming the RR stage.

The register file RF manages general purpose registers GPR, in this example 64 64-bit registers r0 to r63. The selected registers are connected in read or write mode, depending on the decoded instruction, to one of several parallel processing units forming the execution stages E1 to E4. These processing units may include a Load/Store Unit (LSU) accessing a data cache DCACHE, a Floating-Point Unit (FPU), and several arithmetic and logic units ALU (two in this case).

In fact, because the core has a VLIW ("Very Large Instruction Word") architecture, the decoding unit DEC processes packets that can contain multiple instructions to be executed simultaneously—the core can here execute up to five instructions simultaneously, one on each processing unit of the execution stages, and one in a unit BCU described below.

Thus, the core also includes a branch and compare unit BCU connected to process dedicated instructions from the input of the decoder DEC. This BCU, which is designed to support exception handling, includes a set of system function registers SFR, including a program counter PC, configured to contain the address of the currently executed instruction (or the address of the first instruction of a VLIW packet), and a processor status register PS, which defines, among other things, the ring in which the current instruction is executing, the associated permissions, and the masked exceptions. Locations SPC and SPS are also provided for saving the program counter and processor status register.

The BCU is connected to various other units to generate exceptions such as hardware traps or system calls. In particular, the instruction decoder DEC captures system calls, which are specific instructions, while various units or resources can return hardware traps, which may be generically referred to as "unauthorized operations" (access to a non-existent or protected address, access to a protected resource, overflow, etc.).

Finally, the core includes various peripheral units, including an interrupt controller ITC that generates interrupts to the BCU based on external events, a memory management unit MMU associated with a translation look-aside buffer TLB, input/output interfaces IF, performance monitors PM, cache memories, etc. that can also generate exceptions.

The architecture of FIG. 3 described so far and its operation are known and will not be described in more detail below, except for those elements useful for the understanding of the disclosure.

FIG. 4 illustrates an example of a system register set for implementing programmable allocation of rings to exceptions. These registers may include and complement the system function registers SFR of the BCU, and can be accessed via instructions dedicated to the BCU for manipulating these registers.

As mentioned, the SFR register set includes the program counter PC, the processor status register PS, and locations SPC for saving the program counter and SPS for saving the processor status register. In practice, the SPC and SPS locations each contain several registers SPC_PL(i) and SPS_PL(i) dedicated respectively to the individual protection rings PL(i).

The SFR register set also includes exception vectors EV, exception syndrome registers ES, and exception address registers EA, one per ring PL(i) for each type. The exception vectors EV define, for each ring, the addresses of the exception handlers for the different types of exceptions that can occur in the corresponding ring. Each exception syndrome ES contains data stored at the time an exception occurs in the corresponding ring, allowing the exception handler to identify the nature of the exception and adapt the processing. Similarly, each exception address register EA contains a memory address at the origin of the exception in the corresponding ring, allowing the handler to manage memory access traps. The functions of registers EV, ES and EA are known and will not be described in more detail.

The set of registers SFR is supplemented by a group of registers, each of which will be generically referred to as REO ("Resource and Exception Ownership"), configured together to assign each exception or privileged resource in the system to a given protection ring. The ownership registers REO are programmable by a system developer according to the specific needs of his/her software stack. In practice, the content of the REO registers, like that of other SFR registers, can be defined in processor firmware, which is loaded each time the processor boots up. For purposes of saving hardware, configurable resources and exceptions may be grouped together in sets within the REO registers, the differentiation then being achieved by the exception handler.

In addition, the SFR registers can be manipulated at any time by specific instructions dedicated to the BCU, including the REO registers. Thus, nothing prevents the REO registers from being programmed after the system has booted. For example, the firmware may be designed to load an operating system in a given ring, and leave it to the operating system to program the exception and resource ownership, bearing in mind that the operating system will not be able to assign exceptions or resources to a more privileged ring than its own, nor will it be able to assign to itself resources or exceptions assigned to a more privileged level than its own.

The REO register group may include:
SYO: generic system call ownership register;
ITO: interrupt ownership register;
HTO: hardware trap ownership register;
DO: ownership of resources and exceptions for debugging (breakpoints, variable monitoring, etc.);
MO: ("Miscellaneous Ownership") ownership of specific hardware resources (watchdog, performance monitor, MMU, SFR registers, etc.); and
PSO: ownership of bits present in the processor status register PS, or in a corresponding backup register SPS.

These six registers are thus used to programmatically assign exceptions and privileged resources to the rings.

Privileged hardware resources can thus be programmatically assigned to rings, so that any access to such a resource is only allowed to the specified ring or a more privileged ring. Privileged hardware resources may include specific execution units, whereby the execution of a corresponding instruction is also considered as an access to a hardware resource.

The BCU is then configured to trigger a "privilege" trap if such a privileged resource is used in an unauthorized ring. Such privilege traps, although part of traditional traps in the processor specification, are not attributable to a single ring or privilege level. Therefore, they are not assigned an REO register field that would dictate their assignment globally. The handling of such a hardware trap will be the responsibility of the ring set for the privileged resource in the corresponding REO register field.

In the exemplified processor, each REO register, which is 64-bit by construction, can include up to 32 2-bit fields, where the positions of the fields in the register correspond to exception or resource identifiers defined by the processor specifications, and the two bits in each field identify a ring. Each of the 32 possible exceptions or privileged resources is assigned one of four rings. There need not be a one-to-one correspondence—the fields may be used to organize a consistent set of resources or exceptions. The six REO registers configured in this manner widely cover all desired exceptions and resources in a generic processor.

Figure 5A:
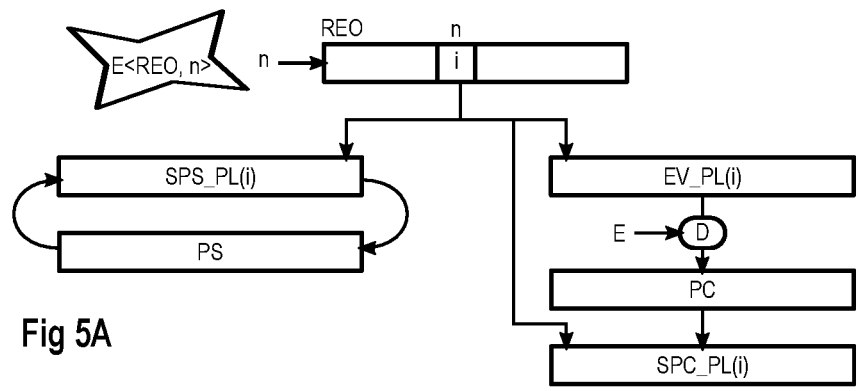
FIGS. 5A and 5B show how the registers in FIG. 4 may be used upon an exception occurrence and a return-from-exception, respectively.
Figure 5B:
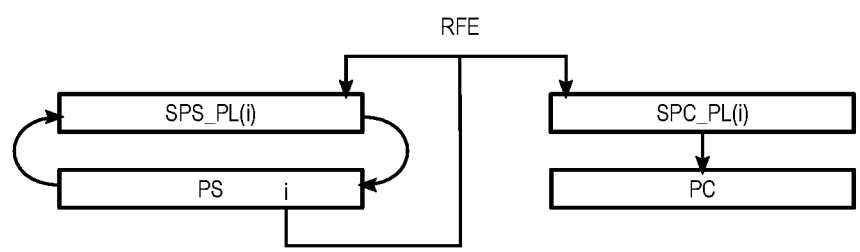

FIGS. 5A and 5B illustrate how the registers of FIG. 4 are used when an exception is triggered and when returning from the exception. The operations described in each of these figures are carried out in hardware.

In FIG. 5A, an exception E is triggered, where E denotes one type of exception among an interrupt IT, a system call SY, a hardware trap HT, or a debug exception D. The hardware may be designed to produce information indicative of the handling of the exception, here a tuple <REO, n>, where REO identifies one of the six registers among: HTO, SYO, ITO, DO, PSO, MO; and "n" is the index in the register.

For a privilege trap exception E, triggered by an unauthorized access to a resource, the hardware may be designed to generate a tuple <MO|PSO, n> identifying the resource targeted by the access (e.g. an unauthorized instruction defined in the MO register, an unauthorized field defined in the PSO register).

For an interrupt exception E, the hardware may be designed to generate a tuple <ITO, s> where "s" is the interrupt number.

For a system call exception E, the hardware may be designed to generate a tuple <SYO, div(m, 1024)>, where "m" is the number of the call, whereby ranges of 1024 call numbers may be associated to each field of the SYO register.

For a hardware trap exception E, e.g. a "page fault", the hardware may generate a tuple <HTO, 12>. In FIG. 5A, the tuple <REO, n> of the exception identifies the REO register to be used and applies the index n to it. This queries the field of position n in the register, which provides a value i identifying the protection ring assigned to the exception. This rank i provided by the REO register selects the processor status backup register SPS_PL(i), the program counter backup register SPC_PL(i) and the exception vector EV_PL(i) assigned to rank i.

At the same time, the contents of the PS and SPS_PL(i) registers are exchanged, the value of the program counter PC is written in the SPC_PL(i) register, and the address provided by the exception vector EV_PL(i) is written in the program counter PC.

The syndrome and exception address registers ES, EA are updated with values characterizing the exception.

At a subsequent clock cycle, the processor executes the instruction identified by the new program counter value PC, which is the first instruction of the exception handler. This handler runs in the ring defined by the new value in the processor status register PS, taking into account the other parameters defined in this register (permissions, masked interrupts, etc.).

In practice, the exception vector EV_PL(i) contains a single address that may not be suitable for all exception types in terms of efficiency, since different exception types require different handling. Thus, as shown, the output address of the EV register may be subject to an offset D that depends on the type of the exception E, so that the execution is redirected to a suitable handler.

In practice, the content of the SPS_PL(i) register is not written in full in the PS register. Indeed, the SPS_PL(i) register contains the values at the end of the last execution of the handler of ring i, which may have been changed from the desired initial values. Thus, the system may force the writing of certain initial values into the PS register, such as interrupt masks and the ring rank, as provided by the REO register.

The relation of E to <REO, n> may be wired in the hardware, as indicated. For example, in a conventional processor, an MMU configuration instruction is scanned by the hardware at each execution to verify that the running program is running in the ring associated with the supervisor privilege, the current ring being identified by a dedicated field in the processor status register PS. In other words, the dedicated field in the PS register is typically compared to a fixed value, and a privilege trap is triggered when the comparison fails. In a processor of the type described here, the hardware is wired to compare the dedicated field in the PS register, not to a fixed value, but to the programmable contents of a dedicated field in the MO register, say the field at position k. Then, when the comparison fails, the hardware triggers the privilege trap by producing the tuple <MO, k>.

In FIG. 5B, the exception handler executes a return-from-exception RFE that aims to resume the interrupted program. The rank of the current ring i, which can be read from the PS register, selects the backup registers SPS_PL(i) and SPC_PL(i).

At the same time, the contents of the PS and SPS_PL(i) registers are exchanged and the program counter PC receives the contents of the SPC_PL(i) register, which restores the context of the interrupted program.

At the next clock cycle, the interrupted program resumes from where it stopped.

According to an embodiment, the write instructions of the REO registers are designed to be used with a relative ring rank, i.e. an increment between 0 and +3 which the BCU unit adds to the current ring rank to obtain the absolute ranks to be written in the REO register. This functionality is illustrated in FIG. 4 by a register write instruction "SET_REO" received by the BCU unit, conveying a relative ring rank as a parameter, applied to an adder 10 that also receives the current ring rank contained in a PL field of the processor status register PS. The sum produces the absolute rank to be written in the targeted REO register.

With this configuration, the processor firmware can boot the most privileged software layer of a given software stack in an arbitrary ring, and allow this first software layer to program the rings of the other layers itself without having to know which ring it is in. The software stack can then be placed anywhere in the stack of available rings without having to recompile the different layers.

This feature can be useful, for example, when a platform is offered with a low-level debugging layer (ring 0) for a given software stack (example in FIG. 1C), and when it is later wished to move the software stack into production on the most privileged rings (i.e. shift the layers in FIG. 1B one stage downwards).

On a conventional processor, removing the debugging layer would result in the configuration shown in FIG. 1B, with a void at ring 0. This would preserve the binaries of rings 2 and 3, but the hypervisor in ring 1 would still have to be recompiled to handle the exceptions that were handled by the debugger. Then, shifting the whole stack down would involve recompiling all layers.

With the proposed embodiment, no recompilation is necessary. In the case of FIG. 1C, the firmware is configured to boot the debugger in ring 0. The debugger programs the exceptions it handles (relative rank +0) and starts the hypervisor, which can program the exceptions it handles as well as those handled by the upper layers, using the relative ranks +0 to +2, translated by the BCU unit into absolute ranks 1 to 3. Alternatively, the hypervisor can delegate to the operating system the programming of the exceptions to be handled by the operating system and by the application program—the operating system would use the relative ranks +0 and +1, translated by the BCU unit into absolute ranks 2 and 3.

By removing the debugging layer, the firmware can be configured to boot the hypervisor this time in ring 0. The hypervisor will operate in exactly the same way to program exception assignments with relative ranks +0 to +2, this time translated by the BCU unit into absolute ranks 0 to 2.

The use of relative ranks to designate the rings implies the implementation of a guardrail to deal with overflows and underflows. Indeed, a software stack could inadvertently be booted in too high a ring, wherein the last layer of the stack sits above the last ring.

Such a situation may be captured by a dedicated "ring overflow" hardware trap triggered by the BCU, which could be handled by a system reset.

However, such an overflow trap may also be diverted to simulate the presence of additional rings. The trap is then handled by a routine that sets up the requested new ring, for example by saving the contents of the SFR registers associated with an unused ring (probably a low-level ring), assigning these registers to the new ring, and reprogramming them to match the privileges of the new ring. This mode of operation makes it possible to envision software stacks with many more than 4 rings, and to use the physically implemented ones as a cache.

The possibility of reprogramming the attributions of exceptions, resources, and instructions to rings opens up many other perspectives, of which only a few examples can be mentioned here.

For example, it is common for a processor, such as the one of FIG. 3, to include several performance monitors PM, for example four. In a conventional architecture, they would presumably be assigned (in a fixed way) to the operating system ring, and applications would access them through system calls, which introduces latency. Depending on the software stack targeted by the developer, there may be a benefit in assigning the performance monitors differently. For example, a single-layer software stack, such as a real-time system, would be best executed in ring 0, where it could access the four performance monitors directly. In a two-layer stack (operating system and application code), there may be a benefit in distributing the performance monitors between the two corresponding rings, so that the application code has direct access to a set of monitors dedicated to it.

In a software stack with a hypervisor, one might wish to assign a performance monitor to each of the three involved rings.

The disclosed system accepts all these scenarios by programming corresponding fields in the MO register (miscellaneous exceptions) accordingly. Access to a specific resource, such as a performance monitor, may be performed via a dedicated field in an SFR register by executing an instruction managed by the BCU. The MO register can then attribute a given ring to the dedicated field of the SFR register. Thus, if the current ring has the required rights, the BCU instruction is executed normally, providing direct access to the resource. Otherwise, the BCU unit triggers a trap to the ring specified in the MO register. This mechanism authorizes direct resource access to a given programmed ring.

Figure 6A:
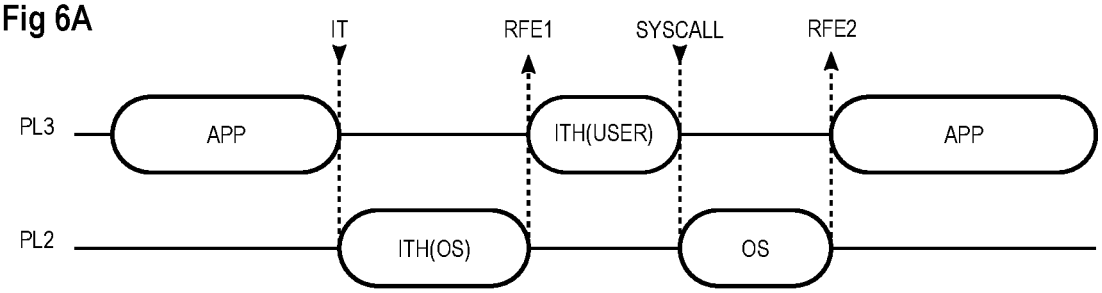
FIGS. 6A and 6B illustrate the handling of a so-called "horizontal" interrupt, respectively in a conventional processor and in a processor with programmable ring allocation.
Figure 6B:
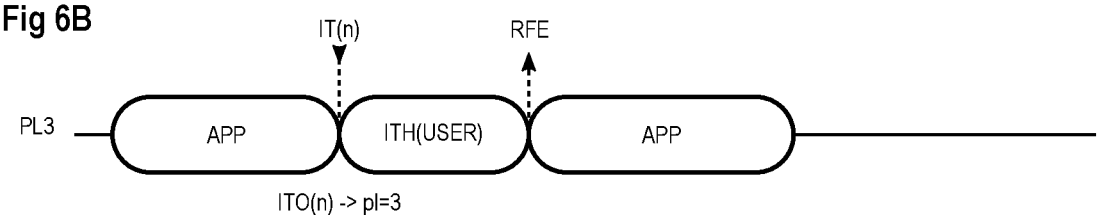

FIGS. 6A and 6B illustrate the processing of a so-called "horizontal" interrupt, respectively in a conventional processor and in a processor with a programmable attribution of exceptions to rings.

A "horizontal" interrupt is an interrupt that can be processed in the same ring as that where the interrupted program runs. They may be interrupts generated by peripherals that can be accessed directly by the application code without affecting system integrity. An example of implementation of horizontal interrupts is the pre-emptive and asynchronous management of data from a command queue accessible to the application. FIG. 6A is a time diagram illustrating the processing of such an interrupt in a conventional manner. In a conventional processor, an interrupt is by construction always directed towards a more privileged ring. Thus, when an application code APP running in ring 3 receives an interrupt IT, the execution is diverted to ring 2, e.g. the operating system OS, to be processed there by an interrupt handler ITH(OS).

The interrupt handler ITH(OS) determines the nature of the interrupt and executes a special return-from-exception RFE1, which prepares the program counter PC and the PS register to execute the interrupt handler ITH(USER) in ring 3 (often a dedicated process for this purpose) instead of causing the program APP to resume.

A process running the interrupt handler ITH(USER) processes the interrupt and ends with a system call SYSCALL to the operating system to restore the context of the program APP that was saved by the operating system when the interrupt occurred.

Finally, the operating system restores the context by executing a return-from-exception RFE2 that resumes the interrupted program.

Depending on the system, the implementation of a user callback function related to an interrupt may differ, but generally requires multiple round trips between the user world and the operating system world.

FIG. 6B illustrates the same case handled by a processor with programmable ring allocation. Here, the horizontal interrupt in question, identifiable by a given number n, is assigned, by programming the ITO register, to the same ring as that of the program expected to be interrupted, i.e. 3 in this example.

Thus, when the interrupt IT(n) occurs, the system operates according to the mechanism of FIG. 5A to execute the ring 3 interrupt handler, and resumes execution of the interrupted program according to the mechanism of FIG. 5B. This avoids useless round trips between rings, with the benefit of significantly reducing latency.

Figure 7:
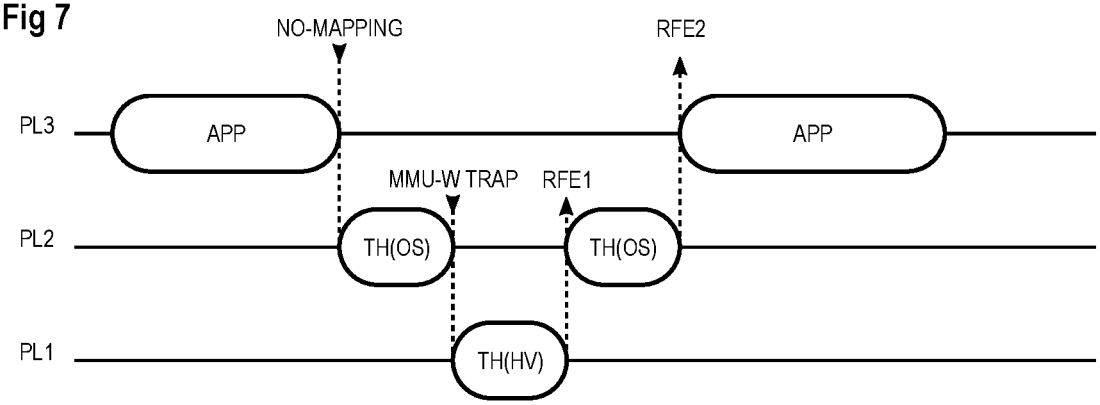
FIG. 7 illustrates an example of handling a memory access error in a virtualized system.

FIG. 7 illustrates another application of a processor with programmable ring allocation, allowing a relatively efficient use of memory in a virtualized configuration that does not have dedicated virtualization hardware.

An operating system generally provides its applications with a space of virtual addresses that are translated into physical addresses using the memory manager MMU (it should be noted here that the notion of "virtual" address is independent of the notion of "virtual" machine in the context of a virtualized system). The application code has direct access to the MMU for routine read and write operations in memory, using a translation table called a page table that is maintained by the operating system. The most commonly used entries in the page table are usually cached in the MMU, in what is called the TLB (Translation Lookaside Buffer). As long as the virtual addresses used by the application code have a translation in the page table, the operating system does not interfere. When a translation is missing from the page table, a no-mapping trap is triggered and directed to the operating system to update the page table.

When the operating system is a "guest" system running in a virtual machine managed by a virtual machine hypervisor or monitor ("host"), address translation presents complexities. The physical addresses assigned to the virtual addresses are "guest" or intermediate physical addresses that make no sense because they are an illusion created by the hypervisor for the guest operating system. They are to be translated further to physical host or machine addresses in order to be exploited. There are various hardware extensions available for handling these translations, such as a SLAT ("Second Level Address Translation"), over which the present processor architecture does not offer particular advantages. Such hardware extensions are, however, expensive in silicon surface area.

In the context of software management of address translations, however, the present architecture can offer optimizations.

The hypervisor is generally configured to maintain a secondary table for direct translation of virtual addresses into physical host addresses, often referred to as a "shadow table". This feature will be used below.

The system is also configured such that the virtual machine has access to the MMU without apparent restrictions, but such that the MMU write instructions are assigned, by programming a dedicated field of the MO register, to ring 1 (hypervisor).

FIG. 7 is a time diagram illustrating an example of how a no-mapping trap occurring in this configuration is handled.

During its normal execution, an application program APP running on the virtual machine, e.g. in ring 3, performs memory accesses using the MMU (or TLB). The TLB translates the virtual addresses used by the application program directly into physical host addresses through a stealthy intervention of the hypervisor based on the secondary translation table.

The performance of the virtual machine is then equivalent to that of a real machine.

When the virtual address used has no translation, the MMU triggers a no-mapping trap, which is conventionally directed to ring 2, where the guest operating system is running.

The operating system then reacts in a conventional manner to attempt to update the MMU. Due to the fact that the MMU write instructions are assigned to ring 1, this initiative causes a privilege trap to the hypervisor ring. The hypervisor then takes over to "correct" the update that the operating system initiated. For this purpose, the hypervisor uses the secondary table and replaces the physical guest addresses used by the operating system with physical host addresses, and hands over to the guest operating system by executing a return-from-exception RFE1. The guest operating system "believes" it has updated the MMU and hands over to the application program by executing a return-from-exception RFE2.

This structure also has the feature that the software stack running in the virtual machine can run without recompilation on a real machine. In other words, if the virtual machine is alone in the system, the hypervisor layer can be removed to leave only the layers of rings 2 and 3. For this purpose, it suffices to reassign the MMU write instructions to ring 2.

What is claimed is:

1. A processor comprising:
multiple protection rings of increasing privilege levels assigned to respective software layers including a combination selected from an application program, an operating system, a virtual machine hypervisor, and a debugger;
a processor status register storing a protection ring in which a current instruction of a software layer is executed;
multiple privileged hardware resources including at least (i) execution units responsive to specific instructions and (ii) configuration registers;
a programmable resource ownership table implemented in the configuration registers, assigning each privileged resource to a respective protection ring; and
wherein the processor is configured to compare the current protection ring stored in the status register with a ring programmed in the ownership table for a privileged resource accessed by the current instruction, and trigger a privilege trap when the comparison fails.

2. The processor according to claim 1, wherein the ownership table is additionally programmable to assign exceptions to protection rings and the processor is configured to respond to an exception by diverting handling of the exception to the ring programmed for the exception in the ownership table.

3. The processor according to claim 1, configured to:
respond to the privilege trap by diverting handling of the trap to the ring programmed for the privileged resource in the ownership table.

4. The processor according to claim 2, comprising:
execution units that can trigger exceptions at the occurrence of events during the execution of a program by the processor;
for each protection ring, a respective processor status backup register, defining the protection ring and corresponding rights; and
an exception handling circuit, configured to, when an exception or a trap is triggered:
look-up an ownership register with an index produced with the exception or trap, to provide the corresponding protection ring;
exchange the contents of the processor status register with the contents of the status backup register corresponding to the looked-up protection ring; and
divert the current program to an exception handler program, whereby the handler program executes in the protection ring defined by the new contents of the processor status register.

5. The processor according to claim 4, comprising:
a program counter identifying the address of an instruction currently executed by the processor;
for each protection ring, a respective backup register of the program counter;
for each protection ring, a respective exception vector identifying the addresses of the exception handler programs of the corresponding protection ring;
wherein the exception handling circuit is also configured to, when an exception is triggered:
save the contents of the program counter in the program counter backup register corresponding to the looked-up protection ring; and
write the address provided by the exception vector corresponding to the looked-up protection ring in the program counter.

6. The processor according to claim 4, including a system-register-write instruction implemented by the processor to write in an ownership register identified by a first parameter of the instruction a sum of a rank of the current ring and a relative rank conveyed by a second parameter of the instruction.

7. The processor according to claim 4, wherein the exceptions include a horizontal interrupt and the ownership register is programmed to attribute the horizontal interrupt to a same protection ring as a program layer capable of triggering the horizontal interrupt.

8. A method for executing software layers having different privilege levels on a processor, comprising the following steps:
- assigning multiple protection rings of increasing privilege levels to respective software layers including a combination selected from an application program, an operating system, a virtual machine hypervisor, and a debugger;
- providing multiple privileged hardware resources including at least (i) execution units responsive to specific instructions and (ii) configuration registers;
- assigning each privileged resource to a respective protection ring in a programmable resource ownership table implemented in the configuration registers;
- executing a current instruction of a current software layer;
- storing in a processor status register the protection ring of the current software layer;
- comparing the protection ring stored in the status register with a ring programmed in the ownership table for a privileged resource accessed by the current instruction; and
- triggering a privilege trap when the comparison fails.

9. The method according to claim 8, comprising the following steps:
- executing a current program in a protection ring and according to rights defined in the processor status register;
- for each protection ring, defining, in a respective processor status backup register, a protection ring and corresponding rights; and
- when the trap is triggered, exchanging the contents of the processor status register with the contents of the status backup register corresponding to the ring programmed in the ownership table for the privileged resource accessed by the current instruction.

10. The method according to claim 8, comprising the following steps:
- running the hypervisor in a first ring;
- running the operating system in a second ring that is less privileged than the first ring, wherein the operating system is designed to manage a translation table for translating virtual addresses into physical addresses;
- running the application program in a third ring less privileged than the second ring, wherein the application program is designed to use virtual addresses translated by the translation table;
- in the ownership table, assigning to the second ring a no-mapping trap, triggered when the translation table fails to translate a virtual address used by the application program;
- in the ownership table, assigning the translation table to the first ring, whereby a write access attempt to the translation table by a less privileged ring triggers a privilege trap; and
- configuring a privilege trap handler, executed in the first ring by the hypervisor, to update the translation table.

11. The method according to claim 8, comprising the following steps:
- when booting the processor, programming in the ownership table an initial protection ring for a first software layer, authorizing the first software layer to access less privileged rings than the initial protection ring; and
- when booting the first software layer, programming by the first software layer in the ownership table a second protection ring for a second software layer, wherein the second protection ring is less privileged than the first protection ring.

* * * * *